(12) United States Patent
Sakamoto

(10) Patent No.: US 11,487,076 B2
(45) Date of Patent: Nov. 1, 2022

(54) LENS DRIVE DEVICE, LENS DRIVE METHOD, AND COMPUTER READABLE MEDIUM

(71) Applicant: Asahi Kasei Microdevices Corporation, Tokyo (JP)

(72) Inventor: Ryota Sakamoto, Tokyo (JP)

(73) Assignee: Asahi Kasei Microdevices Corporation, Tokyo (JP)

(\*) Notice: Subject to any disclaimer, the term of this patent is extended or adjusted under 35 U.S.C. 154(b) by 479 days.

(21) Appl. No.: 16/599,120

(22) Filed: Oct. 11, 2019

(65) Prior Publication Data

US 2020/0116975 A1 Apr. 16, 2020

(30) Foreign Application Priority Data

Oct. 15, 2018 (JP) .............................. JP2018-194655
Aug. 30, 2019 (JP) .............................. JP2019-157970

(51) Int. Cl.
*G02B 7/09* (2021.01)
*G03B 13/36* (2021.01)

(52) U.S. Cl.
CPC .............. *G02B 7/09* (2013.01); *G03B 13/36* (2013.01)

(58) Field of Classification Search
CPC ... G02B 7/04; G02B 7/09; G02B 7/08; G02B 7/28; G03B 13/36; G03B 5/00; G03B 3/10; G03B 2217/007; G05B 6/02; G05B 1/00; G05D 3/1481; H02P 25/06; H02P 8/22; H04N 5/23245; H04N 5/232411
See application file for complete search history.

(56) References Cited

U.S. PATENT DOCUMENTS

| | | | | |
|---|---|---|---|---|
| 2014/0110563 | A1* | 4/2014 | Yun | G01B 11/14 250/206.1 |
| 2014/0327813 | A1* | 11/2014 | Imanishi | G03B 17/14 359/823 |
| 2015/0130388 | A1 | 5/2015 | Fukushima | |
| 2017/0219913 | A1* | 8/2017 | Ito | G02B 7/36 |

FOREIGN PATENT DOCUMENTS

| | | |
|---|---|---|
| JP | 2005252760 A | 9/2005 |
| JP | 2006048081 A | 2/2006 |
| JP | 2009116155 A | 5/2009 |
| JP | 2011022563 A | 2/2011 |
| JP | 4662786 B2 | 3/2011 |

\* cited by examiner

*Primary Examiner* — Mustak Choudhury

(57) ABSTRACT

A lens drive device includes a position detecting unit that outputs a detection signal indicating a position of a detected lens and includes a plurality of operation modes allowing operation with different power consumptions, a selecting unit that select an operation mode in which the position detecting unit operates from the plurality of operation modes, a position signal generation unit that generates, a lens position signal based on either one of detection signals depending on the selected operation mode, a calculation unit that calculates a drive amount of the lens based on a target position signal indicating a target position of the lens and the lens position signal; and a drive unit that drives the lens based on the drive amount.

14 Claims, 5 Drawing Sheets

LENS DRIVE DEVICE, LENS DRIVE METHOD, AND COMPUTER READABLE MEDIUM

The contents of the following Japanese patent applications are incorporated herein by reference:
NO. 2018-194655 filed on Oct. 15, 2018
NO. 2019-157970 filed on Aug. 30, 2019.

BACKGROUND

1. Technical Field

The present invention relates to a lens drive device, a lens drive method, and a computer readable medium.

2. Related Art

A technique is known to suppress a current consumption during an unnecessary time zone when a position of a lens is not detected by applying a voltage to a position detecting unit when the position is detected and not applying a voltage when the position is not detected (see for example, Patent Document 1).
Patent Document 1: Japanese Patent No. 4662786

The lens drive device activates a position detection circuit at every interruption triggered by an angular velocity interrupted every 1 ms while a camera is activated, and thus, the position detection circuit always operates. As one example, a current consumption of a position detecting unit in the lens drive device accounts for about 70% of a total current consumption, and this leads to increase in a power consumption of an entire image capture system.

SUMMARY

In a first aspect of the present invention, a lens drive device is provided. The lens drive device may include a position detecting unit that outputs a detection signal indicating a position of a detected lens and includes a plurality of operation modes allowing operation with different power consumptions. The lens drive device may include a selecting unit that select an operation mode in which the position detecting unit operates from the plurality of operation modes. The lens drive device may include a position signal generation unit that generates, based on the detection signal, a lens position signal according to the selected operation mode. The lens drive device may include a calculation unit that calculates a drive amount of the lens based on a target position signal indicating a target position of the lens and the lens position signal. The lens drive device may include a drive unit that drives the lens based on the drive amount.

The selecting unit may change a parameter used by the calculation unit for calculating the drive amount according to the operation mode.

The lens drive device may include a storage device that stores the detection signal. The position signal generation unit may generate the lens position signal based on either one of a detection signal output from the position detecting unit and a detection signal stored in the storage device depending on the operation mode.

The calculation unit may perform a PID control based on the lens position signal and the target position signal and the selecting unit changes a control parameter of the PID control of the calculation unit according to the operation mode.

The position detecting unit may detect a position of the lens in different operating cycles in the plurality of operation modes.

The plurality of operation modes may include a continuous detection mode in which a position of the lens is detected in a first operating cycle and a power saving mode in which the position of the lens is detected in a second operating cycle longer than the first operating cycle and the position of the lens is not detected at a period among a plurality of position detection operations of detecting the position of the lens by switching an operation of the position detecting unit to a power saving operation.

The selecting unit may select an operation mode in which the position detecting unit operates from the plurality of operation modes based on a change in an external signal input from an outside.

The selecting unit may select an operation mode in which the position detecting unit operates from the plurality of operation modes based on a change amount in the target position signal input from an outside.

The selecting unit may select an operation mode in which the position detecting unit operates from the plurality of operation modes based on an image capture instruction of a camera including the lens input from an outside.

The selecting unit may change a parameter used by the calculation unit for calculating the drive amount based on a change in an external signal input form an outside.

The calculation unit may perform a PID control based on the lens position signal and the target position signal and the selecting unit may change a control parameter of the PID control of the calculation unit based on a change in an external signal input from an outside.

The position signal generation unit may generate the lens position signal based on the detection signal newly detected by the position detecting unit at each of timings at which the drive amount is calculated in a first operation mode, and may generate the lens position signal based on the detection signal that is used in the past for generating the lens position signal and stored in a storage unit at at least a part of the timings at which the drive amount is calculated in a second operation mode.

The position detecting unit may include a sensor that detects a position of the lens. The position detecting unit may include a sensor drive unit that drives the sensor. The position detecting unit may include a signal amplification unit that amplifies a signal from the sensor. The position detecting unit may include an A/D converter that converts an analog signal into a digital signal. The selecting unit may cause at least one of the sensor, the sensor drive unit, the signal amplification unit, and the A/D converter to be intermittently operated when selecting an operation mode in which the position detecting unit operates with a relatively low power consumption.

In a second aspect of the present invention, a lens drive method is provided. The lens drive method may include position detecting of outputting a detection signal indicating a position of a lens detected by position detecting means. The lens drive method may include selecting an operation mode in which the position detecting means operates from a plurality of operation modes in which the position detecting means operates with different power consumptions. The lens drive method may include generating based on the detection signal, a lens position signal according to the selected operation mode. The lens drive method may include calculating a drive amount of the lens based on a target position signal indicating a target position of the lens and the lens position signal. The lens drive method may include driving the lens based on the drive amount.

In a third aspect of the present invention, a computer readable medium is provided. The computer readable medium may store a program that causes a computer to perform the above method.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described with reference to embodiments of the invention. However, the following embodiments should not to be construed as limiting the claimed invention. Also, all the combinations of the features described in the embodiment(s) are not necessarily essential for means provided by aspects of the invention.

Figure 1:
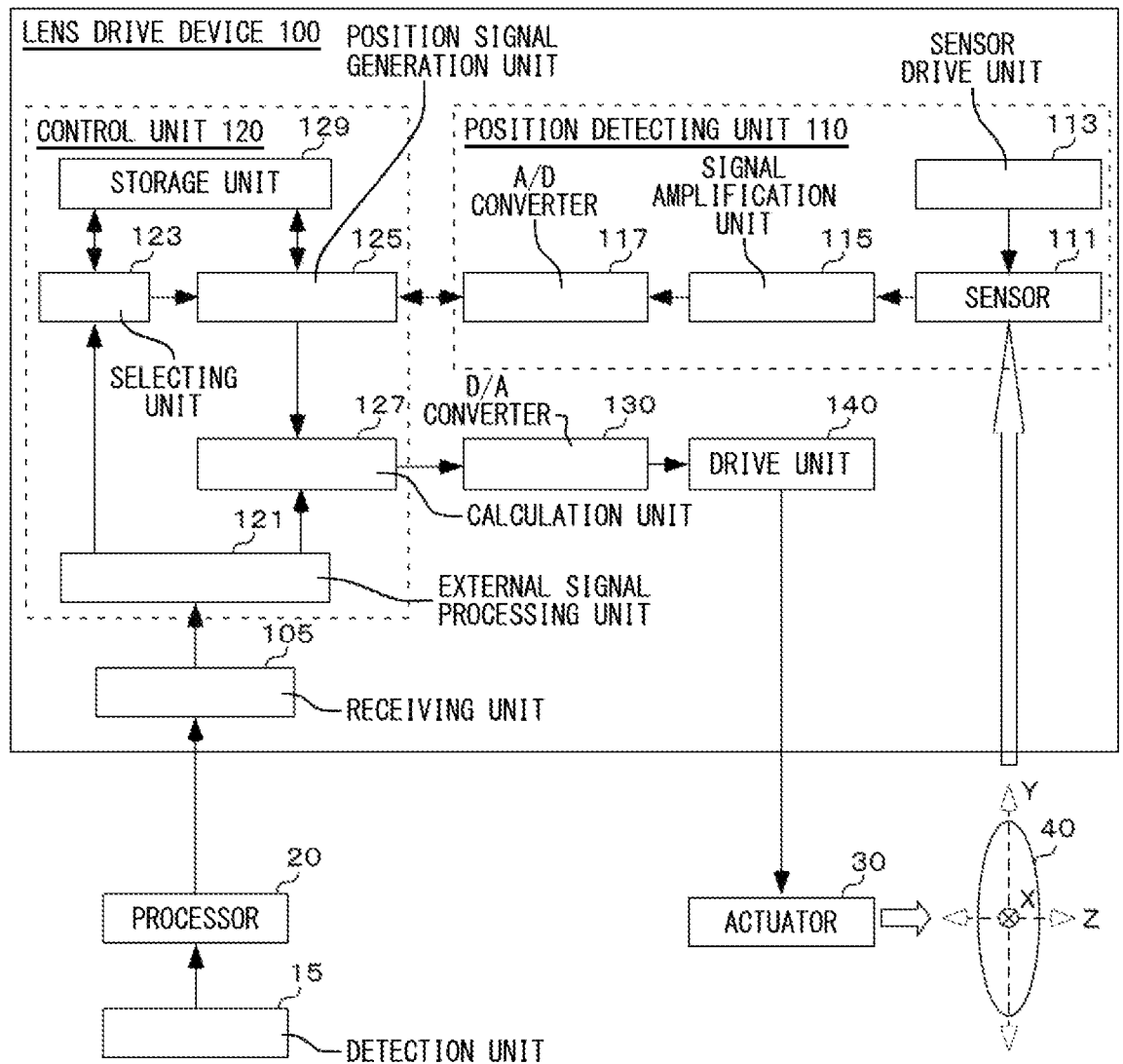
FIG. 1 illustrates a configuration example of an image capture system 10 according to the present embodiment.

FIG. 1 illustrates a configuration example of an image capture system 10 according to the present embodiment. The image capture system 10 includes a detection unit 15, a processor 20, an actuator 30, a lens unit 40, and a lens drive device 100.

The detection unit 15 detects a movement of an instrument mounted with the lens unit 40 or the like. As one example, the detection unit 15 includes an angular velocity sensor or the like to detect an angular velocity ω of the lens unit 40. The processor 20 calculates a target position of the lens unit 40 based on a detection result of the detection unit 15 and transmits an external signal indicating the target position to the lens drive device 100.

The actuator 30 drives the lens unit 40 in response to the external signal from the lens drive device 100. The actuator 30 may move the lens unit 40 by using magnetic force. For example, the actuator 30 includes a coil and may include an electromagnet that generates magnetic force according to a current flowing through the coil. The actuator 30 may move the lens unit 40 by generating magnetic force such that magnets provided to the lens unit 40 are attracted or separated.

The actuator 30 changes a position of the lens unit 40 in one direction, for example. A plurality of actuators 30 may be provided corresponding to each of a plurality of different directions to move the lens unit 40 and change positions of the lens unit 40 in the directions. As one example, the plurality of actuators 30 move the lens unit 40 in two different directions (for example, x and y directions) or three different directions (for example, x, y, and z direction). As illustrated in FIG. 1, x, y, and z directions are orthogonal to one another, and the z direction is an optical axis direction of the lens unit 40.

The lens unit 40 includes one or more lens. The lens drive device 100 causes the actuator 30 to move the lens unit 40 to a target position in xyz space based on the external signal from the processor 20. As one example, the lens drive device 100 may perform an image stabilization control of a camera or the like by causing the actuator 30 to move the lens unit 40 to a target position in an xy plane according to the external signal from the processor 20, or may perform an autofocus control of a camera or the like by causing the actuator 30 to move the lens unit 40 to a target position on an optical axis in the z direction. The lens drive device 100 includes a receiving unit 105, a position detecting unit 110, a control unit 120, a D/A converter 130, and a drive unit 140.

The receiving unit 105 receives the external signal from the processor 20. For example, the receiving unit 105 is connected to the processor 20 via a transmission interface and receives the external signal output from the processor 20 by processing software. Further, the receiving unit 105 receives an external signal. The receiving unit 105 may receive an external signal at a predetermined cycle. As one example, the receiving unit 105 may passively receive an external signal through push-type communication. In a case where the external signal from the processor 20 is transmitted to the receiving unit 105 by using a specified communication system, the receiving unit 105 may receive the external signal according to the communication system. The receiving unit 105 may receive the external signal transmitted from the processor 20 through, for example, a serial communication system, a parallel communication system, a network, a wireless communication system or the like. Further, the receiving unit 105 may receive the external signal from the processor 20 by using a transmission interface that has an OS or the like controlling a priority order or the like of transmission signals, such as, for example, $I^2C$ (Inter-Integrated Circuit) system. The receiving unit 105 supplies the received external signal to an external signal processing unit 121.

The position detecting unit 110 detects a position of the lens unit 40 and outputs a detection signal indicating the detected position of the lens unit 40. The position detecting unit 110 includes a sensor 111, a sensor drive unit 113, a signal amplification unit 115, and an A/D converter 117.

The sensor 111 detects a position of the lens unit 40. The sensor 111 may detect an angle and/or position of the lens unit 40 in one direction. The sensor 111 may detect an angle and/or position of the lens unit 40 in each of a plurality of directions. The sensor 111 may detect a position of the lens unit 40 by sensing, for example, a magnetic field, reflected light, an eddy current, an electrostatic capacitance, an ultrasonic sound wave and the like that change according to the position of the lens unit 40. As one example, when the lens unit 40 includes a magnet or the like, the sensor 111 is preferably a magnetic sensor detecting a magnetic field of the magnet. As one example, the sensor 111 may include a hall element, a silicon hall element, a compound hall element, a magnetic resistance element, a GMR (Giant Magneto Resistive) element, an inductance sensor or the like. The sensor 111 supplies, to the signal amplification unit 115, a detection signal of a position of the lens unit 40.

The sensor drive unit 113 drives the sensor 111. The sensor drive unit 113 drives the sensor 111 by, for example, applying a voltage or a current to the sensor 111. The sensor drive unit 113 may be controlled by the control unit 120.

The signal amplification unit 115 amplifies a signal from the sensor 111. The signal amplification unit 115 may amplify, for example, an amplitude voltage or a current value of a detection signal sensed by the sensor 111 by one or more times. The signal amplification unit 115 supplies, to the A/D converter 117, the amplified detection signal.

The A/D converter 117 converts an analog signal into a digital signal. The A/D converter 117 converts the detection signal received from the signal amplification unit 115 into a digital signal. The A/D converter 117 supplies the converted digital signal to the control unit 120.

The control unit 120 controls the lens unit 40 based on the external signal from the processor 20 and the detection signal from the position detecting unit 110 by controlling the actuator 30 that is a linear device via the D/A converter 130 and the drive unit 140. The control unit 120 may perform a feedback control using a closed loop to move, as one example, the lens unit 40 to a target position indicated by the external signal based on a position of the lens unit 40 indicated by the detection signal. The control unit 120 is a control computer including a CPU such as a microcontroller and functions as each unit described below by executing a detection program. Instead of this, the control unit 120 may be realized by a dedicated circuit or a programmable circuit. The control unit 120 includes the external signal processing unit 121, a selecting unit 123, a position signal generation unit 125, a calculation unit 127, and a storage unit 129.

The external signal processing unit 121 processes an external signal input from the external processor 20 via the receiving unit 105. The external signal processing unit 121 supplies, to the selecting unit 123 and the calculation unit 127, the processed external signal.

The selecting unit 123 selects an operation mode in which the position detecting unit 110 operates from a plurality of operation modes in which the position detecting unit 110 operates with different power consumptions. More specifically, the selecting unit 123 selects the operation mode in which the position detecting unit 110 operates from the plurality of operation modes based on a change in the external signal received from the external signal processing unit 121.

The plurality of operation modes described above may include, for example, a continuous detection mode in which a position of the lens unit 40 is detected in a first operating cycle and a power saving mode in which the position of the lens unit 40 is detected in a second operating cycle longer than the first operating cycle and the position of the lens unit 40 is not detected at a period among a plurality of position detection operations of detecting the position of the lens unit 40 by switching an operation of the position detecting unit 110 to a power saving operation. When selecting an operation mode in which the position detecting unit 110 operates with a relatively low power consumption, that is, for example, the above described power saving mode, the selecting unit 123 causes at least one of the sensor 111, the sensor drive unit 113, the signal amplification unit 115, and the A/D converter 117 included in the position detecting unit 110 to be intermittently operated, and turns off a power source of at least one of them during, for example, a certain time. As one example, the power saving mode may be referred to as an intermittent operation mode of intermittently detecting a position of the lens unit 40 by the position detecting unit 110. The position detecting unit 110 in the power saving mode is lower in a detection frequency of a lens position than the continuous operation mode although it detects a position of the lens unit 40, and thus, a power consumption in the power saving mode is lower than that in the continuous operation mode. One example of the above first operating cycle may be 0.1 ms, and one example of the above second operating cycle may be 0.2 ms, 0.4 ms, or 0.8 ms. The selecting unit 123 may dynamically change the second operating cycle in response to a change in the external signal although in the present embodiment, the second operating cycle is constant regardless of the change in the external signal.

The selecting unit 123 may select the operation mode in which the position detecting unit 110 operates from the plurality of operation modes based on a change amount in a target position signal input from an outside. The target position signal may be included in the above described external signal.

More specifically, the selecting unit 123 may determine that the change amount of the target position signal is small if there is no change in a target position signal from the processor 20 supplied by the external signal processing unit 121 every 1 ms, if the target position signal is not received for a certain period, or if a change amount is equal to or below a threshold of a predetermined change amount and supply a signal indicating that the position detecting unit 110 is in the power saving mode to the position signal generation unit 125. The threshold of the change amount may be stored in the storage unit 129 and referred to by the selecting unit 123. When the change amount of the target position signal is small, as one example, a lens position is not largely changed in an image stabilization control of a camera or the like, and thus, a power consumption is suppressed.

Similarly, when the change amount of the target position signal from the processor 20 supplied from the external signal processing unit 121 every 1 ms is larger than the threshold of the change amount, the selecting unit 123 determines that the change amount of the target position signal is large and may supply a signal indicating that the position detecting unit 110 is in the continuous operation mode to the position signal generation unit 125.

The selecting unit 123 may select the operation mode in which the position detecting unit 110 operates from the plurality of operation modes described above based on, for example, an image capture instruction of a camera including the lens unit 40 input from an outside. The image capture instruction may be output from the processor 20 in response to pressing of a shutter button of the camera. The image capture instruction may be included in the above described external signal.

More specifically, when the image capture instruction is not supplied from the external signal processing unit 121, the selecting unit 123 determines that no change is found in an external signal input from an outside and may supply, to the position signal generation unit 125, a signal indicating that the position detecting unit 110 is in the power saving mode. A feature that no image capture instruction is supplied may mean that, as one example, an autofocus control of a camera or the like may not be performed.

Similarly, when the image capture instruction is supplied from the external signal processing unit 121, the selecting unit 123 determines that a change is found in the external signal input from the outside and may supply, to the position signal generation unit 125, a signal indicating that the position detecting unit 110 is in the continuous operation mode. A feature that an image capture instruction is supplied may mean, as one example, an autofocus control of a camera or the like should be performed.

The position signal generation unit 125 generates a lens position signal based on either one of detection signals, depending on an operation mode selected by the selecting unit 123. More specifically, the position signal generation unit 125 may generate a lens position signal based on either one of a detection signal output from the position detecting unit 110 and a detection signal stored in the storage unit 129 depending on an operation mode. The position signal generation unit 125 may select either the detection signal output from the position detecting unit 110 or the detection signal stored in the storage unit 129 depending on an operation mode and output the selected signal as a lens position signal. The position signal generation unit 125 may generate a lens position signal based on a detection signal that is used in the past for generating a lens position signal and stored in the storage unit 129 at at least a part of timings at which a drive amount of the lens unit 40 is calculated. In the first operation mode, the position signal generation unit 125 may generate a lens position signal based on a detection signal newly detected by the position detecting unit 110 at the timings at which the drive amount of the lens unit 40 is calculated. The first operation mode may correspond to the above described continuous operation mode. In the second operation mode, he position signal generation unit 125 may generate a lens position signal based on a detection signal that is used in the past for generating a lens position signal and stored in the storage unit 129 at at least a part of the timings at which the drive amount of the lens unit 40 is calculated. In this case, every time a detection signal of the lens unit 40 is supplied from the A/D converter 117 of the position detecting unit 110, the position signal generation unit 125 may store the detection signal in the storage unit 129. Note that, the storage unit 129 is one example of a storage device.

The calculation unit 127 calculates the drive amount of the lens unit 40 based on a lens position signal that is received from the position signal generation unit 125 and is subjected to an A/D conversion and a target position signal that is received from the external signal processing unit 121. As one example, the calculation unit 127 calculates the above described drive amount to drive the lens unit 40 such that a position of the lens unit 40 approaches a target position indicated by an external signal. The calculation unit 127 may calculate the drive amount through, for example, a PID (Proportional Integral Differential) operation. In this case, the calculation unit 127 may use a proportional gain, an integral gain, a differential gain and the like as control parameters. The calculation unit 127 supplies, to a D/A converter 130, a drive signal indicating the calculated drive amount.

The D/A converter 130 converts a digital signal into an analog signal. The D/A converter 130 converts the drive signal indicating the drive amount received from the calculation unit 127 into an analog signal. The D/A converter 130 supplies, to a drive unit 140, the converted analog signal.

The drive unit 140 drives the lens unit 40 based on a drive amount indicated by the analog signal input from the D/A converter 130. More specifically, the drive unit 140 is connected to the actuator 30 and causes the actuator 30 to drive the lens unit 40 by a drive amount corresponding to a voltage signal or a current signal that is the analog signal input from the D/A converter 130 by supplying the voltage signal or the current signal to the actuator 30.

Figure 2:
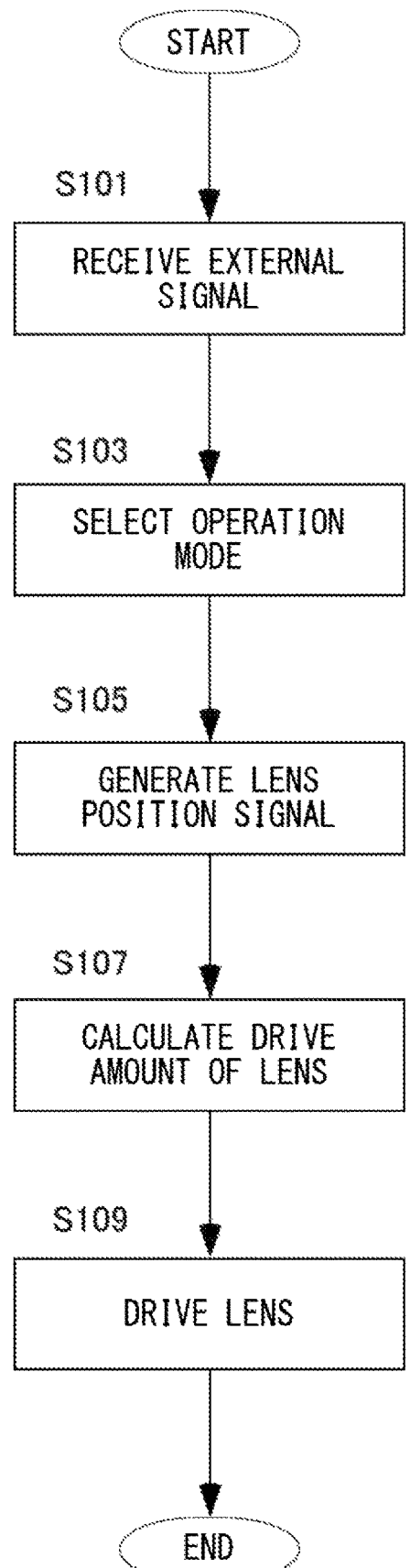
FIG. 2 illustrates an operation flow of a lens drive method according to the present embodiment.

FIG. 2 illustrates an operation flow of a lens drive method according to the present embodiment. The flow starts with the lens drive device 100 receiving an external signal from the processor 20 (step S101).

The selecting unit 123 in the lens drive device 100 selects the operation mode in which the position detecting unit 110 operates from the plurality of operation modes in which the position detecting unit 110 operates with different power consumptions based on a change in the above described external signal (step S103). The position detecting unit 110 is one example of position detecting means.

The position detecting unit 110 detects a position of the lens unit 40 in different operating cycles respectively in the plurality of operation modes. When the continuous operation mode is selected in step S103, the position detecting unit 110 detects a position of the lens unit 40 in the first operating cycle and supplies a detection signal to the position signal generation unit 125 as one example. Alternatively, when the power saving mode is selected in step S103, the position detecting unit 110 detects a position of the lens unit 40 in the second operating cycle and supplies a detection signal to the position signal generation unit 125, but reduces a power consumption by, for example, switching and repeating a position detection operation of 0.1 ms and a power saving operation of 0.1 ms during 1 ms alternately. These processes are one example of processes included in a position detecting stage.

The position signal generation unit 125 generates, based on the detection signal, a lens position signal according to the selected operation mode (step S105). As one example, the detection signal is a latest detection signal of detection signals sequentially supplied from the position detecting unit 110 when the position signal generation unit 125 operates in the first operation mode corresponding to the above described continuous operation mode and the detection signal is a detection signal stored in the storage unit 129 when the position signal generation unit 125 operates in the second operation mode corresponding the above described power saving mode.

The calculation unit 127 calculates a drive amount of the lens unit 40 based on a lens position signal input from the position signal generation unit 125 and a target position signal supplied from the external signal processing unit 121 (step S107) and the drive unit 140 drives the lens unit 40 by driving the actuator 30 based on a voltage signal or a current signal corresponding to the drive amount, that is converted and supplied by the D/A converter 130 (step S109). The flow is repeated as long as a power source of the entire image capture system 10 is turned on.

In the above flow, three steps from step S105 to step S109 may be performed, for example, in response to a periodic interruption every 1 ms. When a position detection of the lens unit 40 is performed in a cycle longer than an interruption cycle, during one or more periodic interruption processes, a mode of the position detecting unit 110 may be switched to the power saving mode, and for example, a power source of the position detecting unit 110 may be turned off.

In recent years, high function terminals called smartphone flagships are required to realize autofocus and image stabilization at high speed and with high accuracy. The autofocus and image stabilization are realized by performing a feedback control using a lens position detection result. Therefore, while a camera is activated, a lens position control is always performed so that a lens is in a desired position. However, it is not always necessary to detect a lens position even if a camera is activated, but the position detection may be performed only when necessary, for example, only when image stabilization is effective such as when a shutter button of a camera is pressed. However, if a lens control is spotted, a lens is sticked to a mechanical end point, and thus, the lens control is always necessary.

On the other hand, according to the above embodiments, the lens drive device 100 in the image capture system 10 controls a position of the lens unit 40 in an optical axis direction (Z direction) in response to an external signal input from the external processor 20 to enable executing an autofocus function. Further, the lens drive device 100 controls a position in an XY plane or three-dimensional position of the lens unit 40 in response to the external signal input form the external processor 20 to enable executing an image stabilization function. Still further, the lens drive device 100 intermittently operates one or more components of the position detecting unit 110 in response to the external signal input from the external processor 20 to enable reducing a current consumption per hour. Even when intermittently operating one or more components of the position detecting unit 110, the lens drive device 100 can prevent the lens unit 40 from sticking to the mechanical end point by continuously driving the lens unit 40 based on a detection signal stored in a storage device.

Figure 3:
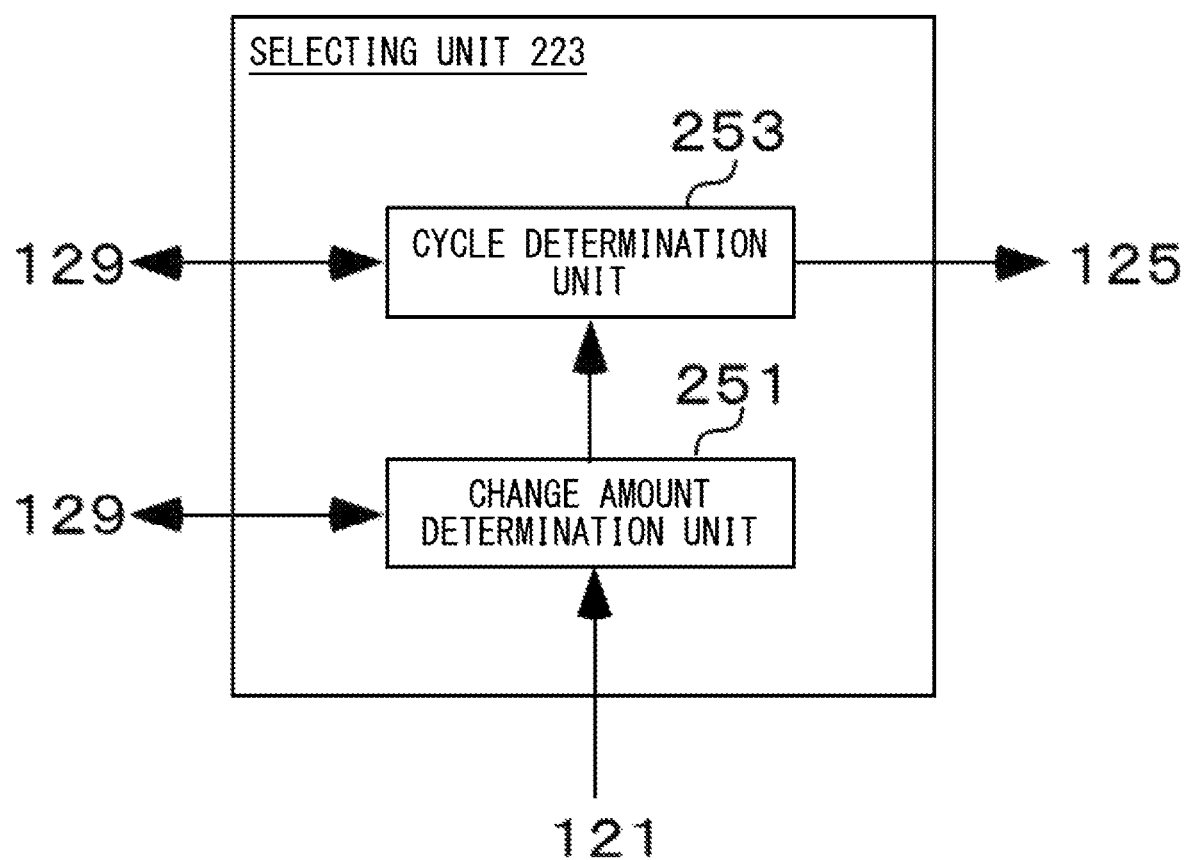
FIG. 3 illustrates a configuration example of a selecting unit 223 according to the present embodiment.

FIG. 3 illustrates a configuration example of a selecting unit 223 according to the present embodiment. A lens drive device 100 according to the present embodiment includes a selecting unit 223 instead of the above-described selecting unit 123. The selecting unit 223 is similar to the above-described selecting unit 123 except that the selecting unit 223 includes a change amount determination unit 251 and a cycle determination unit 253, and thus, duplicated description is omitted.

The change amount determination unit 251 determines a change amount of an external signal supplied from an external signal processing unit 121. The function of the change amount determination unit 251 is similar to a function of determining a change in an external signal by the selecting unit 123 such as a function of determining a change amount in a target position signal and a function of determining whether an image capture instruction is supplied, and thus, duplicate detailed description is omitted. The change amount determination unit 251 may determine at least any one of, for example, whether a change amount ΔPV of an external signal is equal to or below a threshold VTH1 of a change amount, whether the change amount ΔPV of the external signal is equal to or below a threshold VTH2 that is smaller than the threshold VTH 1, and whether the change amount ΔPV of the external signal is equal to or below a threshold VTH3 that is smaller than the threshold VTH 2. These thresholds of the change amount may be stored in a storage unit 129, may be referred to by the change amount determination unit 251, or may be smaller or larger than three in number. The change amount determination unit 251 outputs a determination result to the cycle determination unit 253.

The cycle determination unit 253 determines an operating cycle of a position detecting unit 110 based on the determination result from the change amount determination unit 251. More specifically, for example, when the change amount determination unit 251 determines that the change amount ΔPV of the external signal is larger than the threshold VTH1, the cycle determination unit 253 determines to operate the position detecting unit 110 in the above described first operating cycle, when the change amount determination unit 251 determines that the change amount ΔPV is equal to or below the threshold VTH1 and larger than the threshold VTH2, the cycle determination unit 253 determines to operate the position detecting unit 110 in an operating cycle $t_1$ longer than the first operating cycle, when the change amount determination unit 251 determines that the change amount ΔPV is equal to or below the threshold VTH2 and larger than the threshold VTH3, the cycle determination unit 253 determines to operate the position detecting unit 110 in an operating cycle $2t_1$ that is twice the operating cycle $t_1$, and when the change amount determination unit 251 determines that the change amount ΔPV is equal to or below the threshold VTH3, the cycle determination unit 253 determines to operate the position detecting unit 110 in an operating cycle $3t_1$ that is three times the operating cycle $t_1$. In this manner, the lens drive device 100 can reduce a power consumption by changing a cycle of detecting a position of a lens unit 40 according to the change amount of the external signal input from the outside, that is, by increasing a detection cycle of a lens position and reducing a detection frequency as the change amount of the external signal is small. Theses operating cycles may be stored in the storage unit 129, may be referred to by the cycle determination unit 253, or may be smaller or larger than three in number corresponding to the number of thresholds. The cycle determination unit 253 supplies a signal indicating an operating cycle of the position detecting unit 110 to a position signal generation unit 125. Note that, the signal may be included in a signal indicating an operation mode of the above-described position detecting unit 110.

Figure 4:
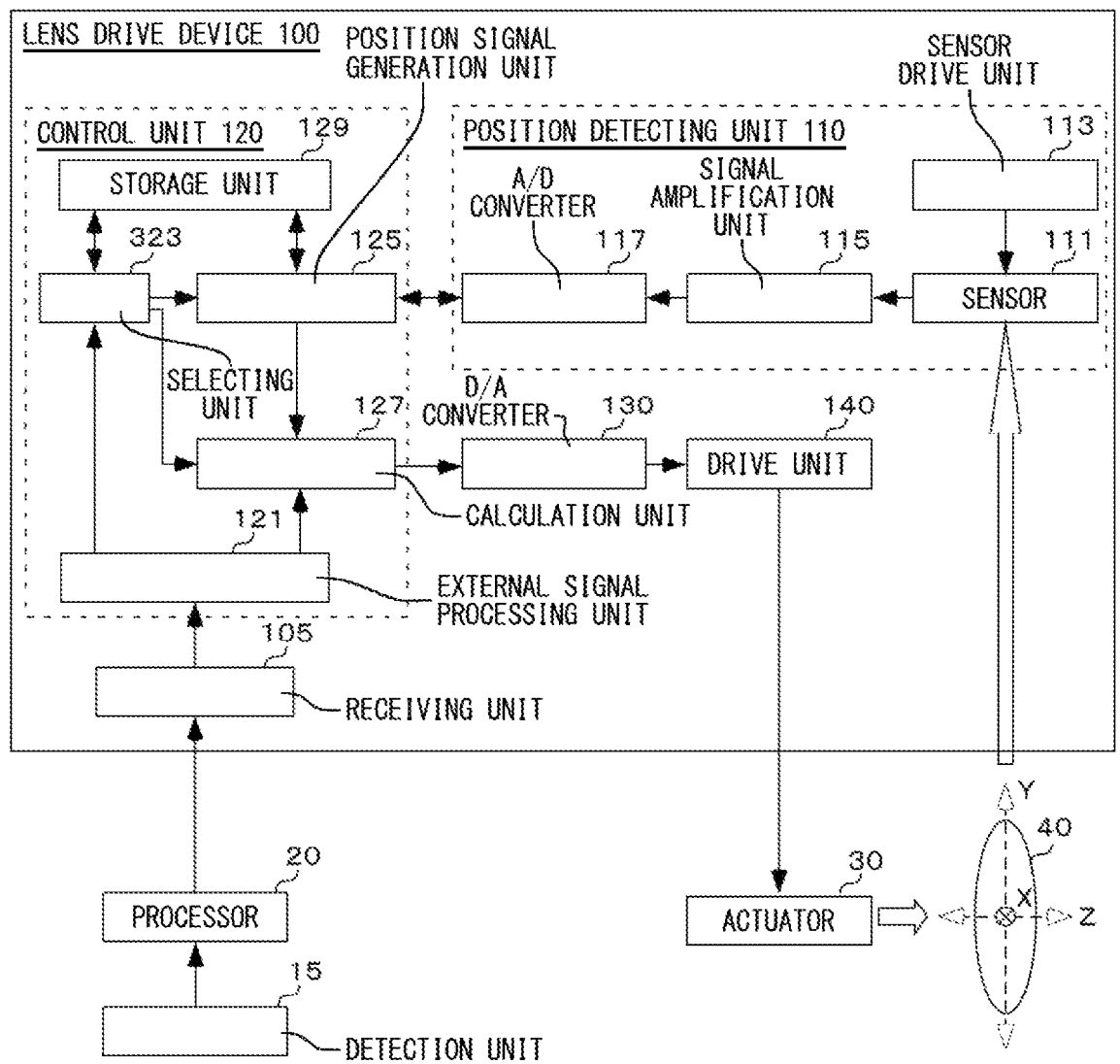
FIG. 4 illustrates a configuration example of an image capture system 10 according to the present embodiment.

FIG. 4 illustrates a configuration example of an image capture system 10 according to the present embodiment. A lens drive device 100 in the image capture system 10 according to the present embodiment includes a selecting unit 323 instead of the above described selecting unit 123. In the following, only differences between the selecting unit 323 and the selecting unit 123 are described, and since other configurations of the image capture system 10 according to the present embodiment are similar to those of the image capture system 10 described with reference to FIG. 1, identical reference numerals are used for corresponding configurations respectively and duplicated descriptions are omitted.

The selecting unit 123 has a similar function as the above described selecting unit 223, that is, the selecting unit 323 changes an operating cycle of a position detecting unit 110 in response to a change amount of an external signal input from the outside. The selecting unit 323 changes a parameter used by a calculation unit 127 for calculating a drive amount based on a change in the external signal input from the outside. The selecting unit 323 may change the parameter used by the calculation unit 127 for calculating the above described drive amount according to an operation mode. The selecting unit 323 changes a parameter such that lens driving is stabilized. The selecting unit 323 may change a parameter such that, for example, either a phase margin or a gain margin increases. Further, the selecting unit 323 may change a parameter such that a gain becomes small and may change a parameter such that a phase advances. For example, when the calculation unit 127 performs a PID control based on a lens position signal supplied from a position signal generation unit 125 and a target position signal supplied from an external signal processing unit 121, the selecting unit 323 changes a control parameter of a PID control of the calculation unit 127 based on the change in the external signal input from the outside.

More specifically, the selecting unit 323 changes at least any one of a proportional gain, an integral gain and a differential gain in the PID control of the calculation unit 127 according to an operating cycle of the position detecting unit 110 that is changed in response to the change amount of the external signal input from the outside. For example, the selecting unit 323 may reduce at least any one of the proportional gain, the integral gain and the differential gain in the PID control of the calculation unit 127. As described above, when intermittently operating the position detecting unit 110, the lens drive device 100 generates a lens position signal based on a detection signal stored in a storage unit 129, but this process leads to using a result obtained by once performing an A/D conversion a plurality of times, and thus, an update cycle of an output of an A/D converter 117 becomes longer, that is, the device operates such that an output of the A/D converter 117 is interpolated in a zero-order hold circuit, and accordingly a delay may occur. When an interpolation point is defined as n, a transfer function of a zero-order hold circuit is represented by the following mathematical equation.

$$H(z) = \frac{1}{n+1} \times \frac{1 - z^{-(n+1)}}{1 - z^{-1}} \quad \text{[Math 1]}$$

As an operating cycle of an intermittent operation of the position detecting unit 110 is increased by two times, three times . . . , a phase lag of a lens position signal input to the calculation unit 127 increases accordingly. When a phase lag increases, in the worst case, an oscillation of a lens unit 40 is caused due to insufficient system stability. On the other hand, the selecting unit 323 according to the present embodiment changes a control parameter of a PID control according to the operating cycle of the intermittent operation of the position detecting unit 110 such that a stable closed loop control can be performed even if a delay occurs.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), Javascript (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 5:
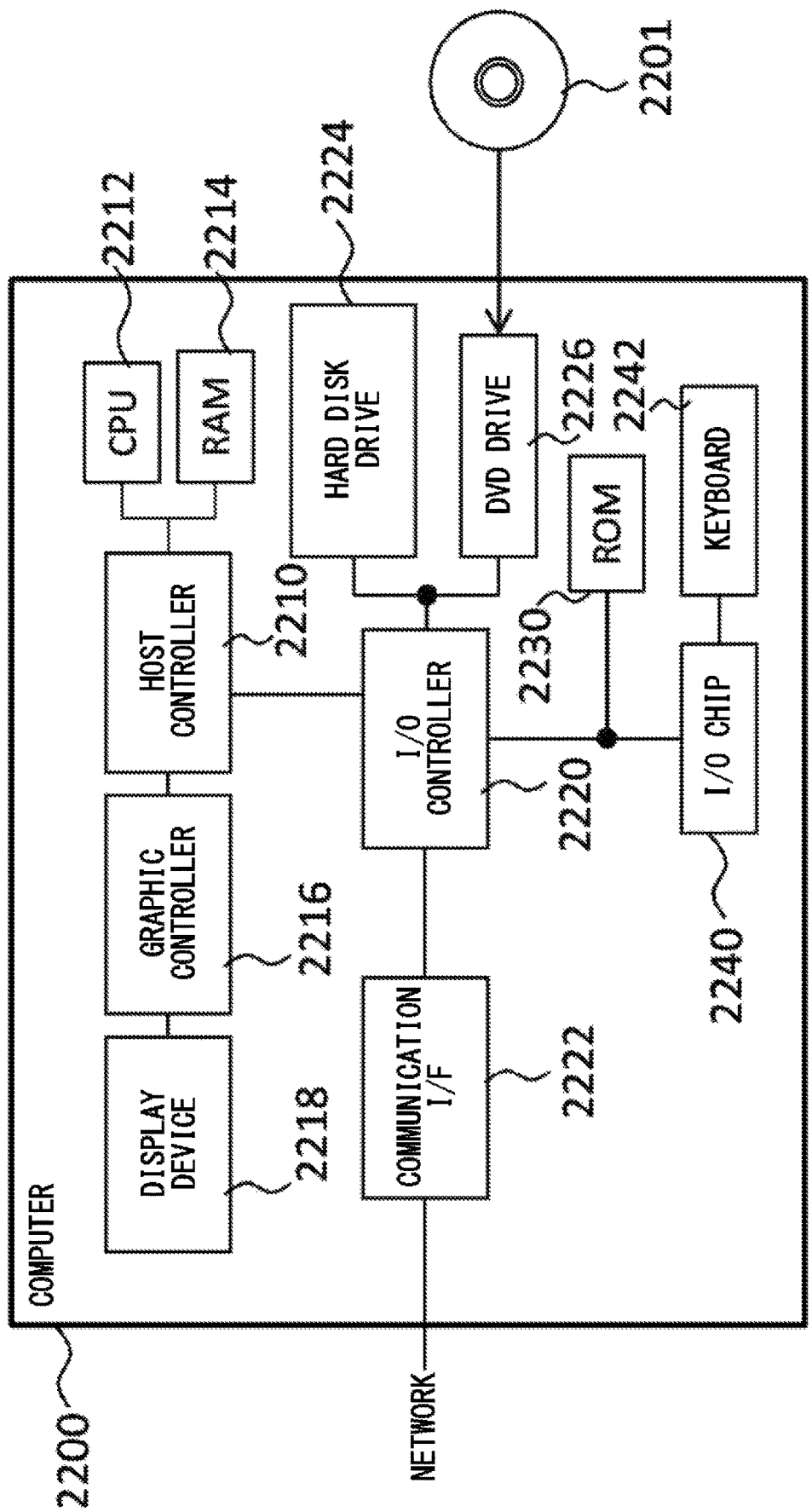
FIG. 5 illustrates one example of a configuration of a computer 2200 according to the present embodiment.

FIG. 5 illustrates one example of a configuration of a computer 2200 in which a plurality of aspects of the present invention may be entirely or partially embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with another electronic device via network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

For example, an external signal supplied from a selecting unit 123 to a position signal generation unit 125 may indicate a continuous operation mode or a power saving mode, and when receiving an external signal indicating a power saving mode, the position signal generation unit 125 may determine a period of reading a detection signal stored in a storage unit 129.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: image capture system, 15: detection unit, 20: processor, 30: actuator, 40: lens unit, 100: lens drive device, 105: receiving unit, 110: position detecting unit, 111: sensor, 113: sensor drive unit, 115: signal amplification unit, 117: A/D converter, 120: control unit, 121: external signal processing unit, 123, 223, 323: selecting unit, 125: position signal generation unit, 127: calculation unit, 129: storage unit, 130: D/A converter, 140: drive unit, 251: change amount determination unit, 253: cycle determination unit, 2200: computer, 2201: DVD-ROM, 2210: host controller, 2212: CPU, 2214: RAM, 2216: graphic controller, 2218: display device, 2220: input/output controller, 2222: communication interface, 2224: hard disk drive, 2226: DVD-ROM drive, 2230: ROM, 2240: input/output chip, 2242: keyboard

What is claimed is:

1. A lens drive device comprising: a position detecting unit that outputs a detection signal indicating a detected position of a lens and includes a plurality of operation modes allowing operation for detecting the position of the lens at different operating cycles respectively; a selecting unit that selects an operation mode in which the position detecting unit operates from the plurality of operation modes based on a change amount in a target position signal indicating a target position of the lens; a position signal generation unit that generates, based on the detection signal, a lens position signal according to the selected operation mode; a calculation unit that calculates a drive amount of the lens based on the target position signal and the lens position signal; a drive unit that drives the lens based on the drive amount; and the selecting unit selects an operation mode in which the position detecting unit operates from the plurality of operation modes based on a change in an external signal.

2. The lens drive device according to claim 1, wherein the selecting unit changes a control parameter used by the calculation unit for calculating the drive amount according to the operation mode.

3. The lens drive device according to claim 1, further comprising:
a storage device that stores the detection signal, wherein the position signal generation unit generates the lens position signal based on either one of a detection signal output from the position detecting unit and a detection signal stored in the storage device depending on the operation mode.

4. The lens drive device according to claim 3, wherein the calculation unit performs a PID control based on the lens position signal and the target position signal; and the selecting unit changes a control parameter of the PID control of the calculation unit according to the operation mode.

5. The lens drive device according to claim 1, wherein the position detecting unit detects a position of the lens in different operating cycles respectively in the plurality of operation modes.

6. The lens drive device according to claim 5, wherein the plurality of operation modes includes a continuous detection mode in which a position of the lens is detected in a first operating cycle: and a power saving mode in which the position of the lens is detected in a second operating cycle longer than the first operating cycle and the position of the lens is not detected at a period among a plurality of position detection operations of detecting the position of the lens by switching an operation of the position detecting unit to a power saving operation.

7. The lens drive device according to claim 1, wherein the selecting unit selects an operation mode in which the position detecting unit operates from the plurality of operation modes based on a change amount in the target position signal.

8. The lens drive device according to claim 1, wherein the selecting unit selects an operation mode in which the position detecting unit operates from the plurality of operation modes based on an image capture instruction of a camera including lens input.

9. The lens drive device according to claim 1, wherein the selecting unit changes a parameter used by the calculation unit for calculating the drive amount based on a change in an external signal.

10. The lens drive device according to claim 9, wherein the calculation unit performs a PID control based on the lens position signal and the target position signal; and the selecting unit changes a control parameter of the PID control of the calculation unit based on a change in the external signal.

11. The lens drive device according to claim 1, wherein the position signal generation unit generates the lens position signal based on the detection signal newly detected by the position detecting unit at each of timings at which the drive amount is calculated in a first operation mode, and generates the lens position signal based on the detection signal that is used in a past for generating the lens position signal and stored in a storage unit at at least a part of the timings at which the drive amount is calculated in a second operation mode.

12. The lens drive device according to claim 1, wherein the position detecting unit includes:

a sensor that detects a position of the lens;

a sensor drive unit that drives the sensor;

a signal amplification unit that amplifies a signal from the sensor; and an A/D converter that converts an analog signal into a digital signal, and wherein the selecting unit causes at least one of the sensor, the sensor drive unit, the signal amplification unit, and the A/D converter to intermittently operate when selecting an operation mode in which the position detecting unit operates with a relatively low power consumption.

13. A lens drive method comprising: position detecting of outputting a detection signal indicating a position of a lens detected by position detecting means; selecting an operation mode in which the position detecting means operates from a plurality of operation modes in which the position detecting means operates with different operating cycles based on a change amount in a target position signal indicating a target position of the lens; generating, based on the detection signal, a lens position signal according to the selected operation mode; calculating a drive amount of the lens based on a target position signal indicating the target position of the lens and the lens position signal; driving the lens based on the drive amount; and selecting an operation mode in which the position detecting means operates from the plurality of operation modes based on a change in an external signal.

14. A non-transitory computer readable medium storing a program that causes a computer to perform the lens drive method according to claim 13.

* * * * *